United States Patent
Kukonya et al.

(10) Patent No.: US 9,695,805 B2
(45) Date of Patent: Jul. 4, 2017

(54) BYPASS SYSTEM FOR A SOLAR THERMAL POWER PLANT

(71) Applicant: ALSTOM Technology Ltd, Baden (CH)

(72) Inventors: Alain Adrien Kukonya, Marange-Silvange (FR); Abhinaya Joshi, Glastonbury, CT (US); Apurba Das, Vernon, CT (US); Rahul J. Terdalkar, East Windsor, CT (US); Lionel Aimi, Bavilliers (FR)

(73) Assignee: ALSTOM Technology Ltd., Baden (CH)

( * ) Notice: Subject to any disclaimer, the term of this patent is extended or adjusted under 35 U.S.C. 154(b) by 97 days.

(21) Appl. No.: 14/609,761

(22) Filed: Jan. 30, 2015

(65) Prior Publication Data

US 2016/0222948 A1    Aug. 4, 2016

(51) Int. Cl.
| | |
|---|---|
| *F03G 6/06* | (2006.01) |
| *F01K 13/00* | (2006.01) |
| *F24J 2/34* | (2006.01) |
| *F24J 2/00* | (2014.01) |

(52) U.S. Cl.
CPC .............. *F03G 6/067* (2013.01); *F01K 13/00* (2013.01); *F24J 2/345* (2013.01); *F24J 2002/0038* (2013.01); *Y02E 10/46* (2013.01)

(58) Field of Classification Search
CPC ... F03G 6/00; F03G 6/005; F03G 6/06; F03G 6/067; F03G 2006/008; F03G 2006/062; F24J 2/34; Y02E 10/40–10/47

USPC .............. 60/641.8, 641.11, 641.15, 646, 659
See application file for complete search history.

(56) References Cited

U.S. PATENT DOCUMENTS

| 4,438,630 A * | 3/1984 | Rowe .................... F01K 3/18 60/641.8 |
|---|---|---|
| 2011/0127773 A1 | 6/2011 | Freund et al. |
| 2012/0102950 A1 * | 5/2012 | Turchi .................... F01K 23/10 60/641.15 |
| 2012/0137683 A1 * | 6/2012 | Jurgen .................... F01D 19/00 60/641.8 |

(Continued)

FOREIGN PATENT DOCUMENTS

| IT | WO 2014086946 A1 * | 6/2014 | ............. F01K 3/006 |

OTHER PUBLICATIONS

EP Search Report, Mar. 14, 2016.

*Primary Examiner* — Laert Dounis
(74) *Attorney, Agent, or Firm* — Dority & Manning, P.A.

(57) ABSTRACT

A solar thermal power system includes a solar receiver for heating thermal energy storage fluid to be stored and utilized from a thermal energy storage arrangement having hot and cold storage tanks. The system includes a steam generator arrangement, which utilizes the heat of the thermal energy storage fluid to produce steam to run a turbine. The arrangement includes a bypass line configured to bypass the hot storage tank from the steam generator arrangement, and to supply the hot thermal energy storage fluid from the solar receiver directly to the steam generator arrangement, during day times, when the solar receiver the steam generator arrangement are both in operating mode, thereby recovering stored potential energy available in the down corner hot thermal energy storage fluid from the solar receiver.

9 Claims, 4 Drawing Sheets

(56) References Cited

U.S. PATENT DOCUMENTS

| | | | |
|---|---|---|---|
| 2013/0019599 A1* | 1/2013 | Birnbaum | F03G 6/067 |
| | | | 60/641.15 |
| 2013/0098354 A1* | 4/2013 | Kummamuru | F24J 2/10 |
| | | | 126/600 |
| 2013/0133324 A1* | 5/2013 | Reynolds | F03G 6/065 |
| | | | 60/641.15 |
| 2013/0192226 A1* | 8/2013 | Stettenheim | F24J 2/055 |
| | | | 60/641.15 |
| 2014/0116048 A1 | 5/2014 | Li et al. | |
| 2014/0194539 A1 | 7/2014 | Hammad et al. | |
| 2015/0000277 A1 | 1/2015 | Reynolds | |
| 2015/0167647 A1* | 6/2015 | Gulen | F03G 6/06 |
| | | | 60/641.11 |

* cited by examiner

BYPASS SYSTEM FOR A SOLAR THERMAL POWER PLANT

TECHNICAL FIELD

The present disclosure generally relates to the field of concentrated solar power, and more particularly, to a concentrated solar thermal power plant with thermal energy storage fluid that utilizes concentrated solar power to store heat energy, and utilize the stored heat energy to generate electricity.

BACKGROUND

A solar thermal power plant based on Direct Steam Central Receiver (DSCR) includes a large field of heliostats and a solar receiver placed on a tower of substantial height. The heliostats focus direct sunlight on to the solar receiver to produce steam to be utilized to run a steam turbine from producing electricity. Typically, the solar thermal power plant operates on a daily cycle, during clear sunlight hours, while shutting down in nights or in cloudy weather. However, if the solar thermal power plant is to meet increasing electricity demand, it needs to be operable irrespective of the availability of solar radiation, i.e. in nights or in cloudy weather. A realization of such a solar thermal power plant generates a requirement of storing solar thermal energy during day times and utilizing thereto in nights or in cloudy seasons. For such requirement, a central receiver including a solar energy storage fluid, such as molten salt, is generally used. The central receiver with molten salt is generally known as Molten Salt Central Receiver (MSCR).

In a typical MSCR system a MSCR, hot and cold storage tanks and a Molten Salt Steam Generator (MSSG) cycle are arranged to utilize the solar energy to produce electricity. In such arrangement, the molten salt fluid heated at the MSCR is stored in the hot storage tank, at temperature of about 565° C., and after thermal energy thereof is being utilized by the MSSG cycle, it is stored in the cold storage tank, at temperature of about 290° C., from where it is further sent to the MSCR to be reheated. In such arrangement, during day and night both, the hot molten salt is pumped through the MSSG cycle to produce steam, which is utilized to produce electricity.

During night, such utilization of the stored molten salt from the hot storage tank by the MSSG cycle using pumps may be effective, however during daytimes, when both of the MSCR and MSSG are working at the same time then such pumps adds significant auxiliary power consumption and reduce overall efficiency of the power plant. The efficiency of the plant may be improved by extracting work from the molten salt that is flowing from the MSCR kept at the height, having sufficient pressure to utilize for generating power or to drive auxiliary equipment and reduce auxiliary power consumption.

SUMMARY

The present disclosure discloses a solar thermal power system that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe a solar thermal power system that may be capable of utilizing the molten salt that is flowing from the MSCR kept at the height and having sufficient pressure to generate power or to drive auxiliary equipment and reduce auxiliary power consumption for improving the efficiency of solar thermal power system.

In one aspect of the present disclosure, a solar thermal power system is described to achieve one or more objects of the present disclosure. The solar thermal power system includes a solar receiver, a thermal energy storage arrangement, a steam generator arrangement and a bypass line. The solar receiver is configured to heat thermal energy storage fluid. The thermal energy storage arrangement includes hot and cold storage tanks. The hot storage tank is configured to receive and store the hot thermal energy storage fluid from the solar receiver, and the cold storage tank is configured to receive and supply the cold thermal energy storage to the solar receiver to be reheated. Further, steam generator arrangement includes at least an economizer section, an evaporator section, a superheater section, a reheat section or combination thereof communicably configured to utilize the heat of the hot thermal energy storage fluid from the hot storage tank to generate and supply the variable pressure steam to a multistage steam turbine. Furthermore, the bypass line is configured to bypass the hot storage tank and supply the hot thermal energy storage fluid from the solar receiver directly to the steam generator arrangement, during day times, when the solar receiver the steam generator arrangement are both in operating mode, thereby recovering stored potential energy available in the hot thermal energy storage fluid flowing from the solar receiver through the down comer.

In accordance with embodiments, the bypass line may be configured between the solar receiver and the superheater and reheat sections of the steam generator arrangement to partially supply the hot thermal storage fluid to both sections. In accordance with embodiments, the bypass line may be configured between the solar receiver and the reheat section of the steam generator arrangement, to supply the hot thermal storage fluid to the reheat section and from there to a supply line between the superheater and the evaporator.

In one embodiment, the solar thermal power system may further include a valve mechanism configured in the bypass line to control the downstream pressure of the hot thermal energy storage fluid flowing through the bypass line.

In one embodiment, the solar thermal power system may further include a pump arrangement configured to pump the hot thermal energy storage fluid from the hot storage tank to the steam generator arrangement.

In one aspect of the present disclosure, a method for operation of a solar thermal power system is provided. The method includes heating thermal energy storage fluid in a solar receiver. Further, the hot thermal energy storage fluid is adapted to be stored in a thermal energy storage arrangement. The thermal energy storage arrangement as described above includes hot and cold storage tanks to, respectively, store the hot thermal energy storage fluid received from the solar receiver, and store cold thermal energy storage fluid to send to the solar receiver. Furthermore, the heat of the hot thermal energy storage fluid from the hot storage tank is utilized to generate and supply the steam at constant/variable pressure to a steam turbine or a multistage steam turbine. As explained above, the steam generator arrangement includes at least an economizer section, an evaporator section a superheater section and a reheat section or combination thereof, communicably configured to each other. Moreover, during day times, when the solar receiver the steam generator arrangement are both in operating mode, the hot storage tank is adapted to be bypassed from the steam generator arrangement via a bypass line to supply the hot thermal energy storage fluid from the solar receiver directly to the steam generator arrangement, thereby recovering stored potential energy available in the down corner hot thermal energy storage fluid from the solar receiver.

In one embodiment, the method further includes pumping the hot thermal energy storage fluid from the hot storage tank to the steam generator arrangement by a pump arrangement. Further, the method includes controlling downstream pressure of the hot thermal energy storage fluid flowing through the bypass line by a valve mechanism. At a partial load condition of the solar thermal power system, the pump arrangement is adapted to be turned on and the valve mechanism is configured to supplement the flow of the hot thermal energy storage fluid in the bypass line.

In accordance with embodiments, where the steam generator arrangement includes the reheat section, the pump arrangement is configured to the provide the hot thermal energy storage fluid directly to superheater section, while the bypass line is configured to directly supply the hot thermal energy storage fluid to configured to the reheat section to reheat the steam.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWING

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms used herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
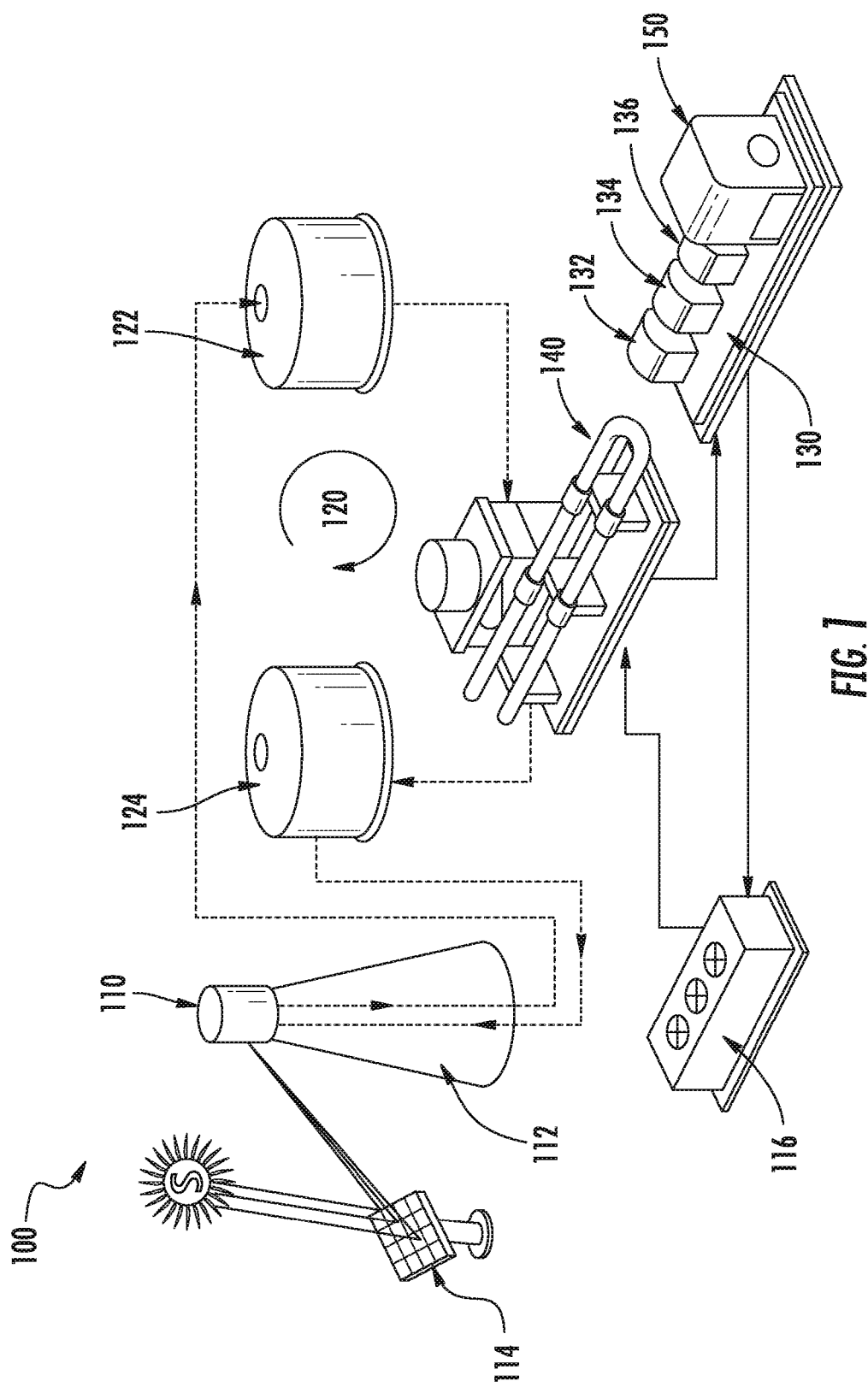
FIG. 1 illustrates overall view of a solar thermal power system, in accordance with one exemplary embodiment of the present disclosure.

Referring to FIG. 1, an example diagrammatic illustration of a solar thermal power system 100 is depicted in accordance with an exemplary embodiment of the present disclosure. The solar thermal power system 100 (hereinafter referred to as 'system 100') includes a solar receiver 110 that may be placed on a tower 112 of substantial height and surrounded by a large field of heliostats 114. The solar receiver 110 receives solar energy from the heliostats 114 to be heated, which is designed to direct the solar energy from the sun 'S'. The system 100 further includes a thermal energy storage arrangement 120 (hereinafter referred to as 'thermal storage arrangement 120') (dotted lines) having a thermal energy storage fluid (hereinafter 'thermal storage fluid') to be circulated through the solar receiver 110 to store thermal energy therein. The thermal storage fluid may generally be a molten salt, a mixture of Sodium and Potassium Nitrates ($NaNO_3$ and $KNO_3$). However, without departing from the scope of the present disclosure, any other thermal storage fluid, such as other salt or liquid metal compositions, may be used as found suitable for the said purpose. The thermal storage arrangement 120 may include hot and cold storages tanks 122, 124. During day times, when solar energy is focused on the solar receiver 110 by the heliostats 114, the thermal storage fluid flowing there through is heated. The heated thermal storage fluid from the solar receiver 110, is supplied and stored in the hot storage tank 122 or may be utilised therefrom. While at nights, the stored heated thermal storage fluid in the hot storage tank 122 is utilized to generate electrical power, and resultant cold thermal storage fluid may be supplied to be stored in the cold storage tank 124. Further during day times, the cold thermal storage fluid from the cold storage tank 124 is supplied the solar receiver 110 to be reheated.

The system 100 further includes a steam turbine/multi-stage steam turbine 130, and a steam generator arrangement 140 to utilize heat of the thermal storage fluid of the thermal storage arrangement 120 for driving an electrical generator 150 to produce electrical power. The steam turbine 130 may include a high pressure steam turbine 132, an intermediate pressure turbine 134 and a low pressure turbine 136, which may be adapted to be operable on a variable pressure steam generated by the steam generator arrangement 140, by utilizing the thermal storage fluid from the thermal storage arrangement 120. The steam generator arrangement 140 may receive water from a feedwater supply 116 to generate and supply the constant/variable pressure steam to the steam turbine 130. In as much as the construction and arrangement of the system 100, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 4B, in the system 100, only those components are shown that are relevant for the description of various embodiments of the present disclosure.

Figure 2A:
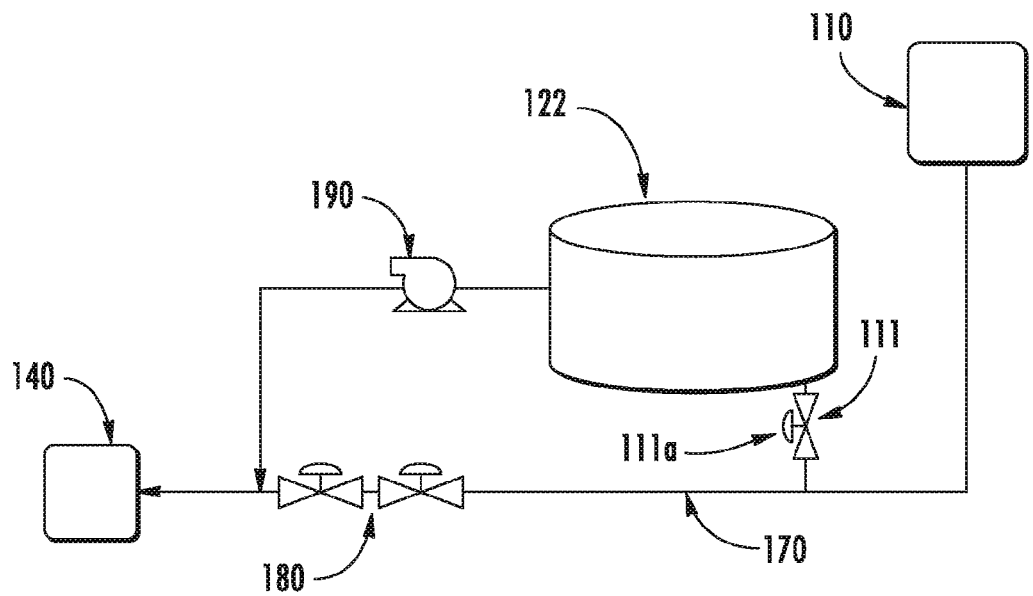
FIGS. 2A and 2B, respectively, illustrate simplified line diagrams of a portion solar thermal power system depicting a bypass line, and a graphical representation, when actual production is more than the actual requirement of the hot thermal energy storage fluid during daytimes, in accordance with one exemplary embodiment of the present disclosure.
Figure 2B:
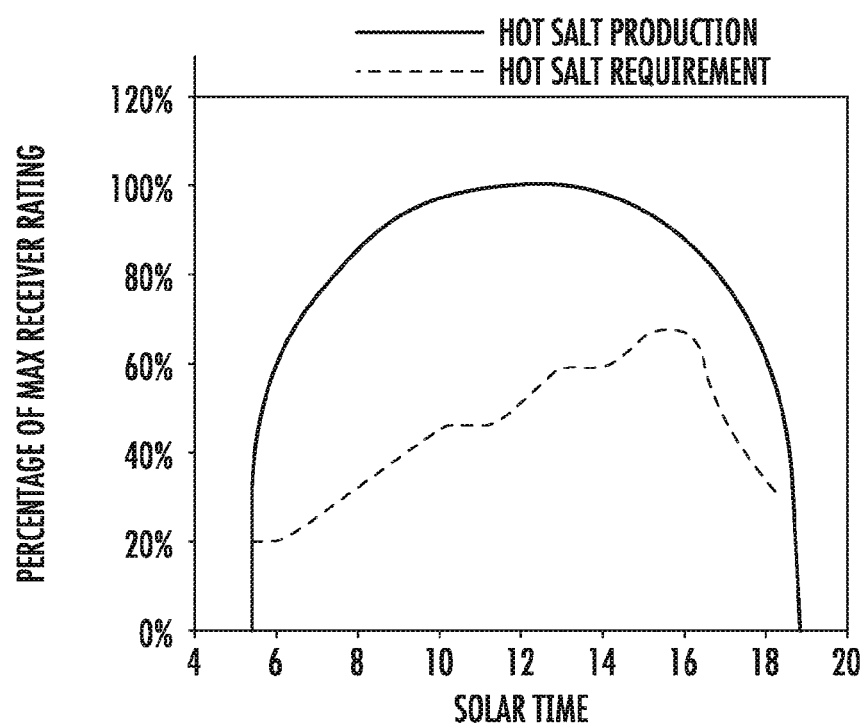

Referring to FIGS. 2A and 2B described in conjunction with FIG. 1, respectively illustrates, simplified line illustrations of the steam generator arrangement 140 and a graphical representation, when actual production is more than the actual requirement of the hot thermal energy storage fluid during daytimes. The arrangement as described above in FIG. 1 is operable during day and night both, where the thermal storage fluid is pumped from the hot storage tank 122 to the steam generator arrangement 140 to produce steam, which is utilized to rotate the steam turbine 130 to produce electricity. The system 100 may include a suitable pump arrangement, such as a pump 190, configured to pump the hot thermal energy storage fluid from the hot storage tank 122 to the steam generator arrangement 140. During night, such pumping of the hot stored thermal storage fluid from the hot storage tank 122 may be effective, however during daytimes, when both of the solar receiver 110 and steam generator arrangement 140 are working at the same time then utilizing the hot stored thermal storage fluid by the steam generator arrangement 140 via the hot storage tank 122 adds significantly to the auxiliary power consumption and reduce overall efficiency of the power plant.

This is because, the hot thermal storage fluid that is flowing from the solar receiver 110 is kept at the height and have sufficient pressure to be utilized to generate power or utilized to drive auxiliary equipment and reduce auxiliary power consumption. Specifically, the down corner hot thermal energy storage fluid from the solar receiver 110 includes stored potential energy, which is wasted, if throttled and stored in the hot tank rather than being directly utilised by the system 100. This can be realized from the FIG. 2B, where during day times the actual production is more than the actual requirement of the hot thermal energy storage fluid in the system 100.

As shown in FIG. 2A, in order to optimize the system 100, the system 100 is adapted to include a bypass line 170. The bypass line 170 is configured to bypass the hot storage tank 122 to directly supply the hot thermal energy storage fluid from the solar receiver 110 to the steam generator arrangement 140, during day times, when the solar receiver 110 the steam generator arrangement 140 both are in operating mode, thereby recovering stored potential energy available in the down corner hot thermal energy storage fluid from the solar receiver 110 to pump the fluid through the steam generator or different section thereof. The system 100, normally, includes a line 111 directly connecting the solar receiver 110 and the hot storage tank 122 and can be regulated by a valve arrangement 111a to allow the hot thermal energy storage fluid from the solar receiver 110 to be stored in the hot storage tank 122 to be utilized for steam production, when the bypass line 170 is not in operation or partial operation.

Figure 3:
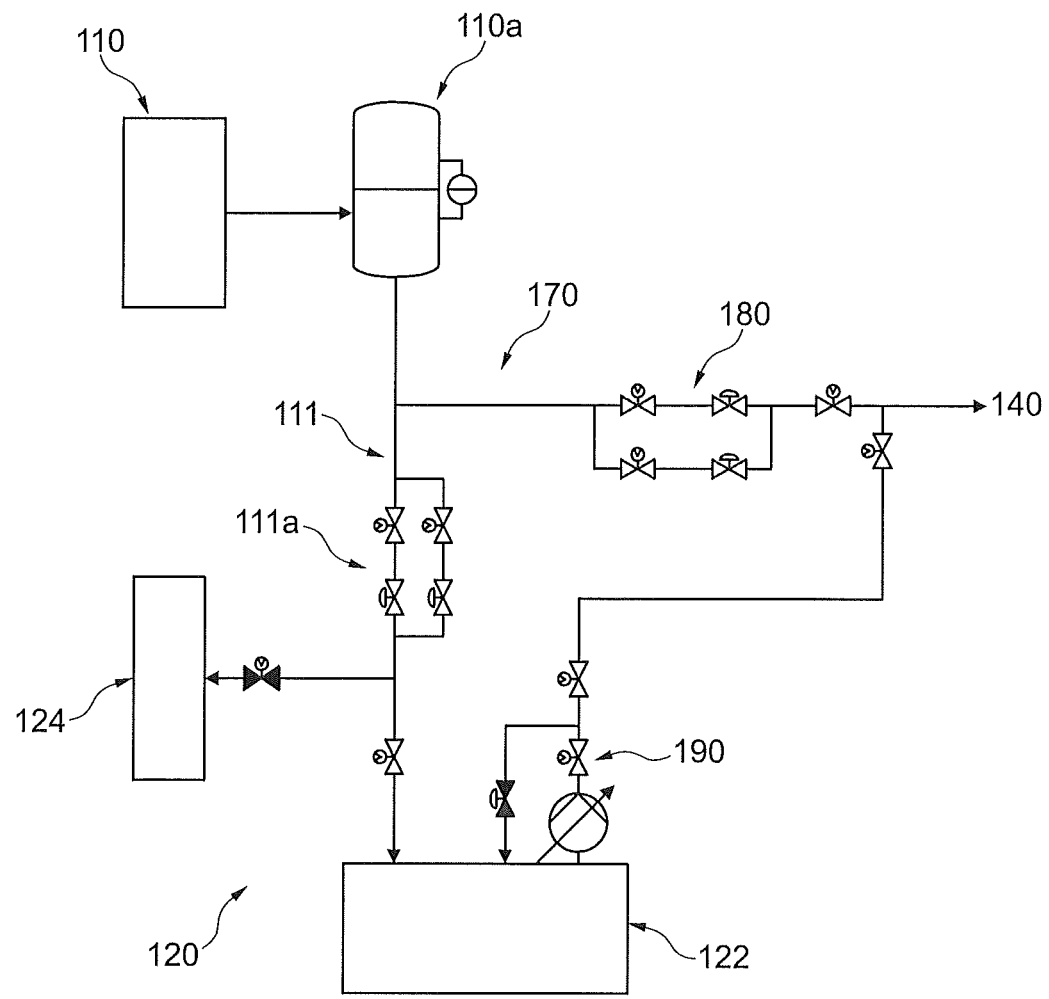
FIG. 3, illustrate detailed line diagrams of a portion solar thermal power system depicting a bypass line, in accordance with another exemplary embodiment of the present disclosure.

FIG. 3, illustrate detailed line diagrams of a portion of the system 100 depicting the bypass line 170. The hot thermal energy storage fluid from the solar receiver 110 may be adapted to be transferred in a vessel 110a, from where it may be transferred to the required location, i.e. either to the hot storage tank 122 for being stored and utilised upon the requirement or directly to the steam generator arrangement 140 for being utilized simultaneously. As shown, the bypass line 170 includes a valve mechanism 180 configured in the bypass line 170 to control the downstream pressure of the hot thermal energy storage fluid flowing through the bypass line 170. The valve mechanism 180 and the pump 190 may be selectively operated depending upon the load, i.e. full-load or partial-load, of the system 100. For example, at the partial load condition of the system 100, the pump arrangement 190 is adapted to be turned on and the valve mechanism 180 is configured to control the flow of the hot thermal energy storage fluid in the bypass line 170. Further as required by the system 100, the pump arrangement 190 may be adapted to be completely shut-off and the valve mechanism 180 is sole source of supply and control the flow of the hot thermal energy storage fluid in the bypass line 170.

In further embodiment of the present disclosure, the bypass line 170 may be configured at various locations to obtain best possible results. For example, FIGS. 4A and 4B illustrate various embodiments of bypass line 170 configuration with the steam generator arrangement 140 and its components.

Figure 4A:
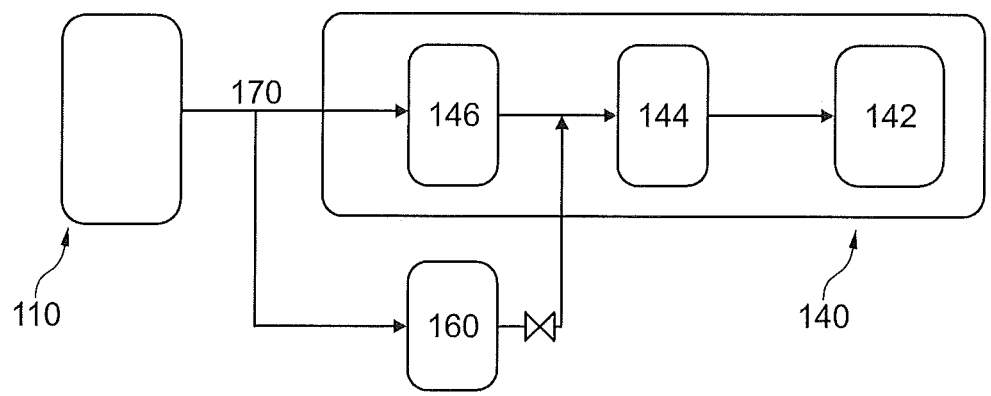
FIGS. 4A to 4B illustrate various embodiments of bypass line configuration with a steam generator arrangement and its components, in accordance with another exemplary embodiment of the present disclosure.
Figure 4B:
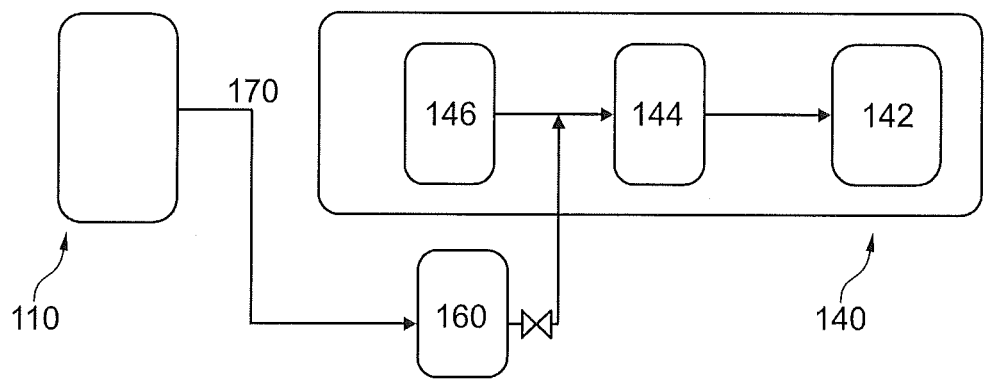

As shown in FIGS. 4A to 4B, the steam generator arrangement 140 may include an economizer section 142, an evaporator section 144 and a superheater section 146 communicably configured to utilize the heat of the hot thermal storage fluid, received from the hot storage tank 122 or directly from the solar receiver 110 via the bypass line 170 to generate said high pressure steam from the water received from the feedwater supply 116. In accordance with further embodiment, the steam generator arrangement 140 may also include a reheat section 160, such as shown in FIGS. 4A and 4B. In accordance with embodiments, as shown in FIG. 4A, the bypass line 170 may be configured between the solar receiver 110 and the superheater and the reheat sections 146, 160 of the steam generator arrangement 140. The hot thermal storage fluid may in predetermined amount, depending upon the industrial requirement, is divided to be supplied partially to the superheater section 142 and partially to the reheat sections 160. In accordance with embodiments, as shown in FIG. 4 B, the bypass line 170 may directly be configured between the solar receiver 110 and reheat section 160 to supply the hot thermal storage fluid to the reheat section 160 and from there to the supply line between the superheater 146 and the evaporator 144 of the steam generator arrangement 140.

These said arrangements of the bypass lines 170 of FIGS. 2A, 3, 4A and 4B allow optimization of the system 100 by directly supplying the hot thermal energy storage fluid from the solar receiver 110 to the steam generator arrangement 140, during day times, when the solar receiver 110 the steam generator arrangement 140 are both in operating mode, thereby recovering stored potential energy available in the down corner hot thermal energy storage fluid from the solar receiver 110.

The present disclosure also includes a method for operation of the system 100. The method includes heating thermal energy storage fluid in the solar receiver 110. Further, the hot thermal energy storage fluid is adapted to be stored in the hot storage tank 122 of the thermal energy storage arrangement 120, as described above. Furthermore, the heat of the hot thermal energy storage fluid from the hot storage tank 122 is utilized to generate and supply the variable pressure steam to the multistage steam turbine 130. Moreover, during day times, when the solar receiver 110 and the steam generator arrangement 140 are both in operating mode, the hot storage tank 122 is adapted to be bypassed from the steam generator arrangement 140 via the bypass line 170 to supply the hot thermal energy storage fluid from the solar receiver 110 directly to the steam generator arrangement 140, thereby recovering stored potential energy available in the down coiner hot thermal energy storage fluid from the solar receiver 110. The various arrangement of the bypass line 170 are configured and described above and excluded herein for the sake of brevity.

As explained above, in one embodiment, the method further includes pumping the hot thermal energy storage fluid from the hot storage tank 122 to the steam generator arrangement 140 using the pump arrangement 190. Further, the method includes controlling downstream pressure of the hot thermal energy storage fluid flowing through the bypass line 170 by the valve mechanism 180. As explained above, the selection of shutting-off or on the pump arrangement 190 may be made depending upon the load condition, i.e. partial or full load of the system 100.

The system 100 of the present disclosure is advantageous in various scopes such as described above. The system is capable of utilizing the molten salt that is flowing from the MSCR kept at the height and having sufficient pressure to generate power or to drive auxiliary equipment and reduce auxiliary power consumption for increasing steam pressure in a steam generator arrangement. The present invention is also capable of being applicable to steam generator technologies and embodiments including where the economizer, evaporator and superheater sections are separated in dedicated components, assembled in series or parallel, or all the three sections combined in one single component.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A solar thermal power system, comprising:
    a solar receiver configured to heat a thermal energy storage fluid;
    a thermal energy storage arrangement comprising:
        a hot storage tank configured to receive and store a hot thermal energy storage fluid from the solar receiver, and
        a cold storage tank configured to receive and supply a cold thermal energy storage fluid to the solar receiver to be reheated;
    a steam generator arrangement comprising at least an economizer section, an evaporator section, a superheater section and a reheat section communicably configured to utilize the heat of the hot thermal energy storage fluid from the hot storage tank to generate and supply steam to a steam turbine; and
    a bypass line having a first end and a second end, the first end of the bypass line located in a down corner upstream of the hot storage tank, the bypass line flowing through the reheat section, the second end of the bypass line located between the superheater section and the evaporator section to supply the hot thermal energy storage fluid directly from the solar receiver to the steam generator arrangement during day times when the solar receiver and the steam generator arrangement are both in operating mode, thereby recovering stored potential energy available in a down corner hot thermal energy storage fluid from the solar receiver to force the hot thermal energy storage fluid through the bypass line to the steam generator without assistance from a pump.

2. The solar thermal power system as claimed in claim 1, wherein the bypass line is configured between the down corner and reheat section of the steam generator arrangement to supply the hot thermal storage fluid to the reheat section and from there to a supply line between the superheater and the evaporator.

3. The solar thermal power system as claimed in claim 1, further comprising a valve mechanism configured in the bypass line to control the downstream pressure of the hot thermal energy storage fluid flowing through the bypass line.

4. The solar thermal power system as claimed in claim 1, further comprising a pump arrangement configured to pump the hot thermal energy storage fluid from the hot storage tank to the steam generator arrangement.

5. A method for operation of a solar thermal power system, the method comprising:
    heating a thermal energy storage fluid in a solar receiver;
    storing a hot thermal energy storage fluid in a thermal energy storage arrangement, the thermal energy storage arrangement comprising hot and cold storage tanks to, respectively, store the hot thermal energy storage fluid received from the solar receiver, and store a cold thermal energy storage fluid to send to the solar receiver;
    utilizing the heat of the hot thermal energy storage fluid from the hot storage tank to generate and supply variable pressure steam to a multistage steam turbine with a steam generator arrangement comprising at least an economizer section, an evaporator section, a superheater section and a reheat section communicably configured to each other; and
    bypassing the hot storage tank and the superheater section of the steam generator arrangement via a bypass line having a first end and a second end, the first end of the bypass line located in a down corner upstream of the hot storage tank, the bypass line flowing through the reheat section, the second end of the bypass line located between the superheater section and the evaporator section to supply the hot thermal energy storage fluid from the solar receiver directly to the steam generator arrangement during day times when the solar receiver and the steam generator arrangement are both in operating mode, thereby recovering stored potential energy available in a down corner hot thermal energy storage fluid from the solar receiver to force the thermal energy storage fluid through the bypass line to the steam generator arrangement without assistance from a pump.

6. The method as claimed in claim 5, further comprising pumping the hot thermal energy storage fluid from the hot storage tank to the steam generator arrangement by a pump arrangement.

7. The method as claimed in claim 5, further comprising controlling downstream pressure of the hot thermal energy storage fluid flowing through the bypass line by a valve mechanism.

8. The method as claimed in claim 6, wherein at a partial load condition of the solar thermal power system, the pump arrangement is adapted to be turned on and the valve mechanism configured to control the flow of the hot thermal energy storage fluid in the bypass line.

9. The method as claimed in claim 6, wherein the pump arrangement is configured to provide the hot thermal energy storage fluid directly to the superheater section, while the bypass line is configured to directly supply the hot thermal energy storage fluid to the reheat section configured in the steam generator arrangement to reheat the steam.

\* \* \* \* \*